N. MIDDLETON.
Air and Water Trap.
No. 161,257.  Patented March 23, 1875.
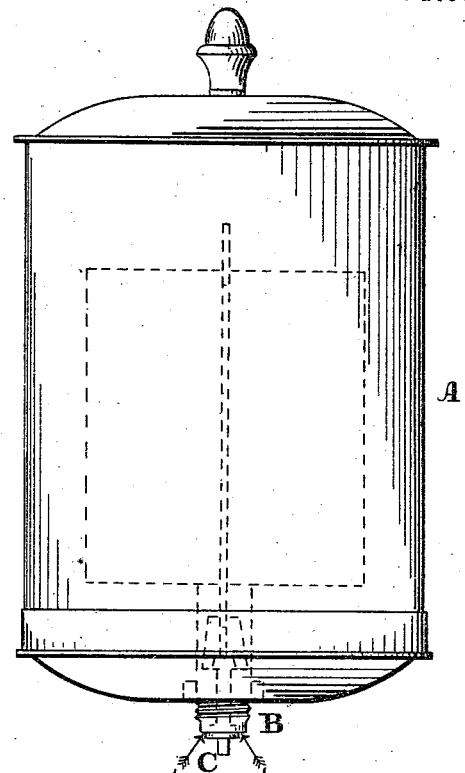
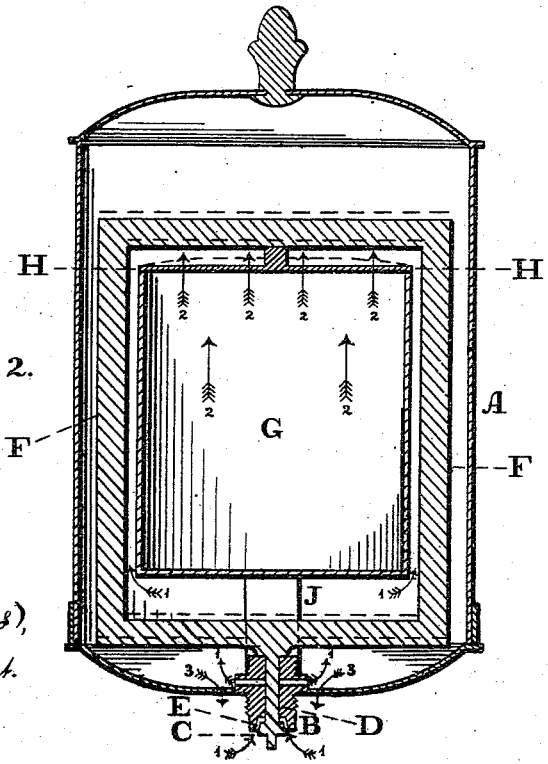

UNITED STATES PATENT OFFICE.

NATHAN MIDDLETON, OF PHILADELPHIA, PENNSYLVANIA, ASSIGNOR OF ONE-HALF HIS RIGHT TO STEPHEN MORRIS, OF SAME PLACE.

IMPROVEMENT IN AIR AND WATER TRAPS.

Specification forming part of Letters Patent No. 161,257, dated March 23, 1875; application filed February 26, 1875.

*To all whom it may concern:*

Be it known that I, NATHAN MIDDLETON, of the city and county of Philadelphia and State of Pennsylvania, have invented a new and useful Improvement in Air and Water Trap for Steam-Heaters; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1 is a side elevation of the device embodying my invention. Fig. 2 is a central vertical section thereof.

Similar letters of reference indicate corresponding parts in the two figures.

My invention relates to an apparatus for trapping air and water of condensation of steam of a steam-heater; and it consists of an air-chamber, which is connected to and automatically operates the valve of the trap or receiver containing said chamber, whereby, after the air enters the trap, the steam follows, and causes an expansion of the air in the chamber, thus occasioning the closing of the valve. The air and the water of condensation in the trap are then permitted to escape through proper exit-openings. When the air-chamber cools, the contraction of the air, and consequently of the chamber, causes the valve of the trap to open, thus permitting the entrance of another supply of air and steam from the heater.

Referring to the drawings, A represents a receiver or trap chamber, which communicates with a steam-heater by means of a tube or hollow connection, B. C represents a valve, whose stem D passes through the tube B, and its seat E is on said tube B. To the upper end of the stem D there is secured a yoke or frame, F, which is thus within the receiver A, and has connected to it a closed air-chamber, G, likewise within said chamber. The side of the chamber G, to which the yoke F is secured, (in the present the upper side H,) is made of a material, preferably metal, which will swell out or bulge, due to the expansion of the air in the chamber G, whereby motion will be imparted to the yoke, and consequently to the valve C.

The operation is as follows: The valve being opened (its normal position) air from the heater first enters the receiver A, and the steam follows the same, as indicated by arrows 1, and the chamber G will be surrounded by steam, so that the air therein is expanded. This causes the side H to swell upwardly, as indicated by arrows 2, which, in its movement, carries the yoke F, and thus elevates the latter. The valve C, being attached to the yoke, is also elevated, and consequently closed, thus automatically closing the communication between the receiver A and the steam-heater. The air and water of condensation of the steam thus trapped in the receiver are now permitted to escape therefrom through openings in the bottom of the receiver, as indicated by arrows 3, or through other proper exits. As the chamber G is now no longer surrounded by live steam, the air therein will cool and contract, thus permitting the side H of the chamber to return to its first position, in which movement the yoke will be lowered and the valve opened, whereby another supply of air and steam will enter the receiver A, and the operation before stated will be repeated.

The yoke F may be fitted between guides J, which, in the present case, consist of strips or uprights rising from the bottom of the receiver A or upper end of the tube D, and embrace the central portion of the lower side of said yoke F.

Having thus described my invention, what I claim as new, and desire to secure by Letters Patent, is—

An air-chamber, automatically operating the valve of an air and steam trap or receiver, by the expansion and contraction of the air in said chamber, substantially in the manner and for the purpose set forth.

NATHAN MIDDLETON.

Witnesses:
JOHN A. WIEDERSHEIM,
ALBERT H. HOECKLEY.